United States Patent
Kohira et al.

(10) Patent No.: US 6,744,598 B2
(45) Date of Patent: Jun. 1, 2004

(54) MAGNETIC DISK DEVICE AND MAGNETIC HEAD SLIDER

(75) Inventors: Hidekazu Kohira, Naka (JP); Masaaki Matsumoto, Fujiasawa (JP); Hideaki Tanaka, Odawara (JP); Teruyoshi Higashiya, Naka (JP); Kiyoshi Hashimoto, Odawara (JP); Akira Matsuda, Odawara (JP); Takanori Yamazaki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/420,904

(22) Filed: Apr. 23, 2003

(65) Prior Publication Data

US 2003/0193750 A1 Oct. 16, 2003

Related U.S. Application Data

(63) Continuation of application No. 09/761,734, filed on Jan. 18, 2001, now Pat. No. 6,556,381.

(30) Foreign Application Priority Data

Apr. 13, 2000 (JP) .......................................... 2000-112437

(51) Int. Cl.[7] ................................................. G11B 5/60
(52) U.S. Cl. ..................................................... 360/235.7
(58) Field of Search ........................... 360/235.7, 235.8, 360/236.5, 236.6

(56) References Cited

U.S. PATENT DOCUMENTS

| | | | |
|---|---|---|---|
| 5,404,256 A | 4/1995 | White | |
| 6,021,020 A | * 2/2000 | Itoh et al. | ................ 360/236.1 |
| 6,351,345 B1 | 2/2002 | Kameyama | |
| 6,396,664 B2 | 5/2002 | Koishi | |
| 6,424,494 B1 | 7/2002 | Koishi | |

FOREIGN PATENT DOCUMENTS

| | | |
|---|---|---|
| JP | 63-057724 | 3/1988 |
| JP | 1-297421 | 11/1989 |
| JP | 2000-057724 | 2/2000 |

* cited by examiner

Primary Examiner—Robert S. Tupper
(74) Attorney, Agent, or Firm—Antonelli, Terry, Stout & Kraus, LLP

(57) ABSTRACT

A magnetic head slider having a plurality of surfaces which are formed sequentially from an adjacent side to a magnetic disk, and a slider rail surface, which is arranged near an air flow-out edge on a nearest surface of the plurality of surfaces including a long sideways rail surface on an air flow-in side and a lengthwise rail surface on an air flow-out side, has a magnetic head. An area of the long sideways rail surface is larger than an area of the lengthwise rail surface.

10 Claims, 10 Drawing Sheets

MAGNETIC DISK DEVICE AND MAGNETIC HEAD SLIDER

CROSS REFERENCE TO RELATED APPLICATION

This is a continuation of U.S. application Ser. No. 09/761,734, filed Jan. 18, 2001, now U.S. Pat. No. 6,556,381, the subject matter of which is incorporated by reference herein and copending with related U.S. application Ser. No. 10/330,368, filed Dec. 30, 2002, and relates to U.S. application Ser. No. 10/420,715, filed Apr. 23, 2003.

BACKGROUND OF THE INVENTION

This invention relates to a magnetic disk device; and, more particularly, the invention relates to the structure of a magnetic head slider and to a magnetic disk in a contact recording magnetic disk device in which the magnetic head slider touches the magnetic disk.

To increase the recording density of a magnetic disk device, a narrowing of flying height, that is defined as the spacing between a magnetic head slider mounted with a magnetic head and a rotating magnetic disk, is important. A uniform flying height over the entire surface of the magnetic disk is also required. Further, any fluctuation of flying height due to environmental changes, especially a decrease of the flying height due to a drop in atmospheric pressure when operating at a high altitude, is required to be minimized. In proportion to a decrease in the flying height, the possibility of contact by the magnetic head slider with the magnetic disk increases; and, if the degree of contact is severe, the magnetic head slider crashes against the magnetic disk and there is a possibility of destroying the recorded data on the magnetic disk.

A technique for generally equalizing the flying height over the entire surface of the magnetic disk, for reducing a decrease of the flying height and for keeping a uniform flying height all over the magnetic disk when the disk is used at a high altitude, is disclosed by JP-A-2000-57724. This Japanese publication discloses a step air bearing sub-ambient pressure force magnetic head slider which generally equalizes the flying height over the entire surface of the magnetic disk and makes it possible to reduce a decrease of the flying height when the disk is used at a high altitude by the adequate combination of the rail surfaces with a step air bearing having a recess with a depth of sub-microns, the recess being deeper than that of the air bearing, for generating a sub-ambient pressure force.

SUMMARY OF THE INVENTION

One way to increase the recording density of a magnetic disk device, while maintaining a high reliability, is to devise measures for preventing contact between the magnetic head slider and the magnetic disk by narrowing and equalizing the flying height over the entire surface of the magnetic disk, by reducing fluctuation of the flying height caused by the variation of the manufacturing techniques of the magnetic head slider, by reducing fluctuation of the flying height during seek operations, and by reducing a decrease of flying height when the disk is used at a high altitude.

However, no matter what measures are taken to achieve the above-described effects, contact between the magnetic head slider and the magnetic disk is unavoidable with a narrow flying height of 15 nm or less, so that the vibration or the wear on the magnetic head slider are becoming a new problem.

Regarding the step air bearing sub-ambient pressure force magnetic head slider disclosed in JP-A-2000-57724, it is disclosed that the flying height is generally uniform, and that fluctuations in the flying height due to variation of the manufacturing tolerances, seek operations and use in a high altitude environment can be reduced. However, no consideration is given especially to the vibration of a magnetic head slider caused by contact with the magnetic disk, so that improvement on this point is needed.

The present invention relates to the above-described needs and intends to provide a magnetic disk device and a magnetic head slider that generally provide a uniform flying height over the entire surface of the magnetic disk, reduce fluctuations in the flying height due to variation of the manufacturing tolerances, during seek operations and use in a high altitude environment, and, in case of contact between the magnetic head slider and the magnetic disk, the magnetic head slider slides on the surface of the magnetic disk smoothly while maintaining a high reliability.

To solve above described problems, the present invention adopts the following technology.

A magnetic head slider comprising: on the air flow-out side, which is the closest to the magnetic disk in operation, a magnetic head mounting surface adjacent to while a magnetic head is mounted; a slider rail surface which is separated from said magnetic head mounting surface and forms a surface near to the air flow-in side, both side surfaces near the air flow-in edge having a depth of 10 nm to 50 nm from the magnetic head mounting surface; a slider step air bearing surface formed to surround said slider rail surface and having a depth of 50 nm to 200 nm from said slider rail surface; and a recess for generating a sub-ambient pressure force surrounding said slider step air bearing surface and having a depth of 400 nm to 1.3 $\mu$m from said slider step air bearing surface.

A magnetic disk device is provided with the magnetic head slider mounted with a magnetic head and a magnetic disk that operates as a data recording medium, wherein the vicinity of said magnetic head of said magnetic head slider has the possibility of contacting said magnetic disk in operation, said magnetic head slider having a length of 1.25 mm or less, a width of 1 mm or less and a thickness of 0.3 mm or less, and the friction force exerted between said magnetic head slider and said magnetic disk is 10 mN or less.

A magnetic disk device is provided with a magnetic head slider having a magnetic head and a magnetic disk that operates as a data recording medium, wherein the vicinity of said magnetic head of said magnetic head slider has the possibility of contacting said magnetic disk in operation, the floating pitch angle of said magnetic head slider being 50 micro-radian or more, the mean surface roughness Ra of said magnetic disk being 2 nm or less and the peak count thereof being 700/400 $\mu$m$^2$ or more.

DESCRIPTION OF THE PREFERRED EMBODIMENTS

A description of various embodiments of the magnetic head slider and the magnetic disk device therewith according to the present invention will be presented with reference to the drawings.

Figure 1:
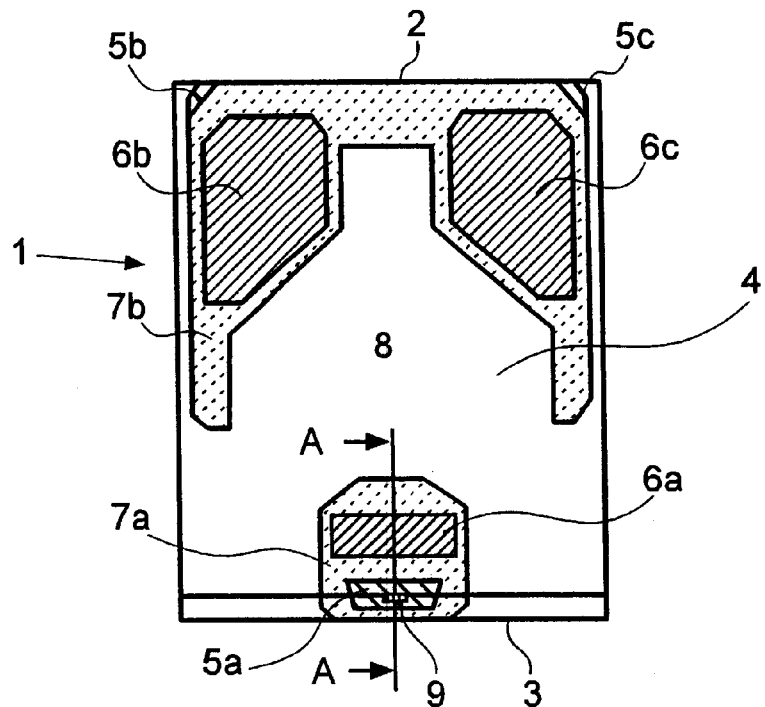
FIG. 1 is the top view of the magnetic head slider representing a first preferred embodiment of the present invention.
Figure 2:
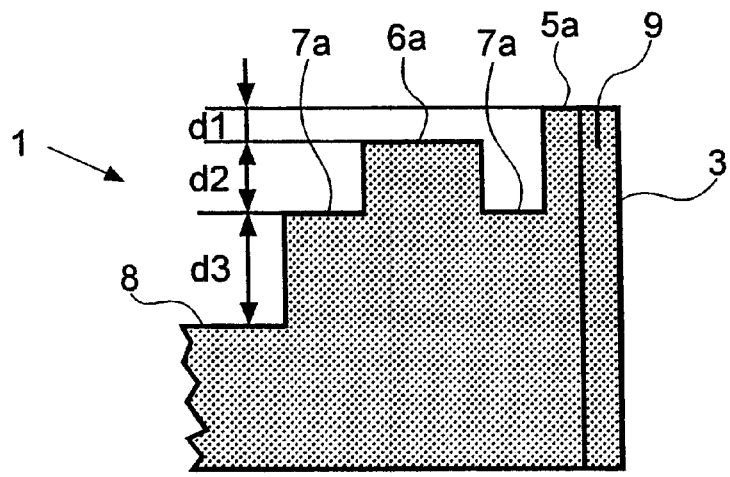
FIG. 2 is a cross-sectional view taken along line A—A in the FIG. 1.

FIG. 1 is a top view of the magnetic head slider of a first preferred embodiment of the present invention. FIG. 2 is the cross section taken along line A—A in FIG. 1.

As is shown, the magnetic head slider 1 of the first preferred embodiment of the present invention is provided with an air flow-in edge 2, an air flow-out edge 3 and a floating surface 4. The floating surface 4, facing a magnetic disk which is not shown, is provided with first surface constituting elements 5a, 5b and 5c, which form a first surface positioned most closely adjacent to the magnetic disk, second surface constituting elements 6a, 6b and 6c, which form a second surface further separated from the magnetic disk than the first surface, third surface constituting elements 7a, 7b and 7c, which form a third surface even further separated from the magnetic head than the second surface, and fourth surface constituting element 8 which forms a fourth surface most separated from the magnetic disk.

The first to the fourth surfaces are substantially parallel planar surfaces arranged such that, the depth d1 from the first surface constituting element 5a to the second surface constituting element 6a is 30 nm, the depth d2 from the second surface constituting element 6a to the third surface constituting element 7a is 120 nm and the depth from the third surface constituting element 7a to the fourth surface constituting element 8 is 800 nm. The magnetic head slider 1 has a length of 1.25 mm, a width of 1.0 mm and a thickness of 0.3 mm.

The first surface constituting element 5a is provided with a magnetic head 9. The magnetic head 9 comprises a recording inductive head and a reproducing GMR (Giant Magneto-Resistance) head. The recording gap of the inductive head and the reproducing gap of GMR are formed on a surface which is substantially in the same plane as the surface of the first surface constituting element 5a.

The term gap refers to either a recording gap or a reproducing gap in the following discussion. Here, substantially the same surface refers to the fact that, since the hardness is different among the base material (generally AlTiC) constituting the magnetic head slider 1, the constituting member of the magnetic head 9 and the protecting member (generally alumina) of the magnetic head, the softer magnetic head will be abraded to a greater extent in lapping work, thereby forming a difference in level of several nanometers. This difference of the level in is not intentional and is clearly different from the other surfaces that are intentionally formed.

In this preferred embodiment of the invention, a surface provided with the magnetic head 9 is defined as the first surface, but a protruding surface provided for the purpose of preventing sticking at the contact stop of the magnetic head on the magnetic disk can be formed on the side closer to the magnetic disk than the first surface.

Figure 3:
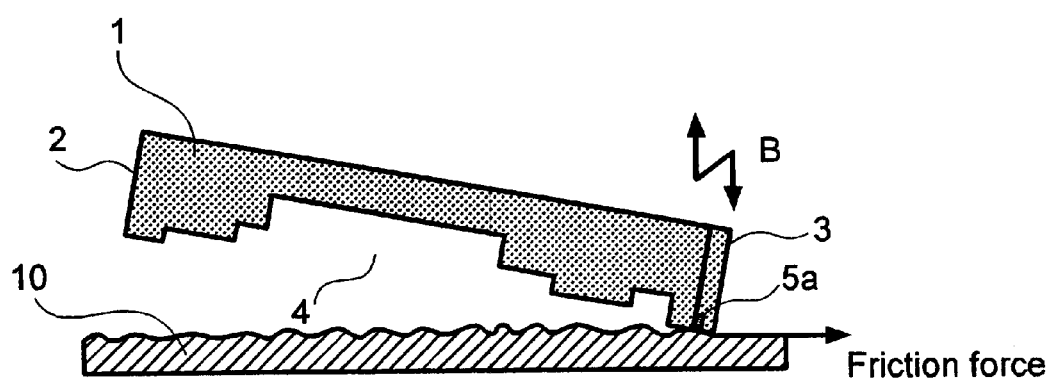
FIG. 3 is the diagram illustrating the state of contact between the magnetic head slider and the magnetic disk in the first preferred embodiment of the present invention.

FIG. 3 is a diagram illustrating the relative positions of a magnetic head slider 1 and a magnetic disk 10 of the above-described first preferred embodiment of the present invention operating inside the magnetic disk device.

When an airflow generated by the rotation of the magnetic disk 10 enters between the magnetic head slider 1 and the magnetic disk 10, pressure is generated between the second surface constituting elements 6a, 6b and 6c and the magnetic disk 10, so that the magnetic head slider 1 begins to float off the surface of the magnetic disk 10. In this preferred embodiment of the present invention, the second surface constituting elements 6a, 6b and 6c correspond to the rail surfaces of a conventional magnetic head slider of the type which has been widely used.

The magnetic head slider 1 is generally designed to float with such an attitude that the flying height on the side of the air flow-in edge 2 is larger than the flying height on the side of the air flow-out edge 3. Therefore, the air flow-out edge 3 approaches most closely to the magnetic disk 10.

In the magnetic head slider of the first preferred embodiment of the present invention, the first surface constituting element 5a approaches most closely to the magnetic disk 10, and in case where the magnetic head slider 1 contacts the magnetic disk 10, the contact occurs at the first surface constituting element 5a, and a friction force is exerted on the contacting surface. The depth dl from the first surface constituting element 5a to the second surface constituting element 6a is 30 nm, so that and the depth dl is sufficient to limit the contact between the magnetic head slider 1 and the magnetic disk 10 to the first surface constituting element 5a. By mounting the magnetic head 9 on the first surface constituting element 5a, the magnetic head 9 approaches the magnetic disk 10 at the closest point, so that and the recording density can be improved.

The third surface constituting elements 7a and 7b are structured to surround the second surface constituting elements 6a, 6b and 6c. The airflow, having entered between the magnetic head slider 1 and the magnetic disk 10, is compressed by the third surface constituting elements 7a and 7b, and then enters the second surface constituting elements 6a, 6b and 6c. The third surface constituting elements 7a and 7b correspond to the step air bearing surface or the tapered surface of the magnetic head that has been widely used. The depth d2 from the second surface constituting element to the third surface constituting element is a very important parameter which operates to equalize the flying height over the entire surface of the magnetic disk. This will be described later.

The fourth surface constituting element 8 is surrounded by the third surface constituting element 7b, and a sub-ambient pressure force is generated at the fourth surface constituting element 8 (this sub-ambient pressure force causes the slider to approach the magnetic disk). That is, the fourth surface constituting element 8 corresponds to a recess for a generating sub-ambient pressure force as provided by the conventional magnetic head that has been widely used. The depth d3 from the third surface constituting element 7a to the fourth surface constituting element 8 is very important to reduce a decrease of the flying height caused by an atmospheric pressure drop when operation occurs in high altitude conditions, and this will be described afterward.

Figure 4:
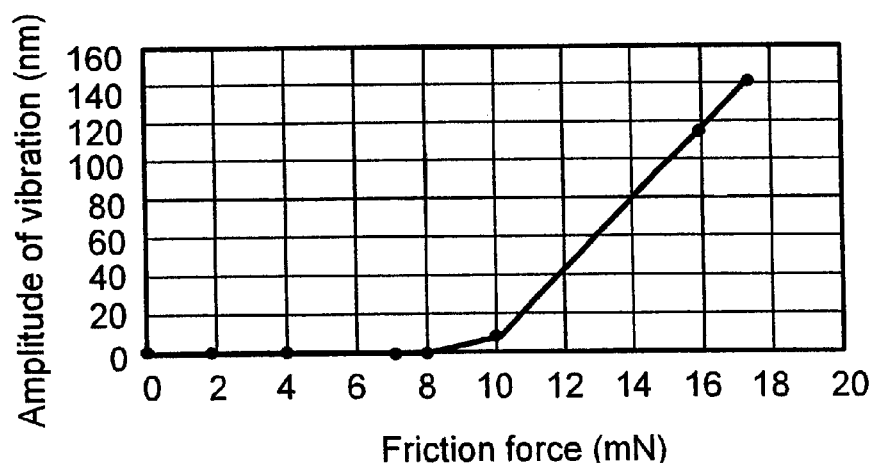
FIG. 4 is a graph showing the relation between the friction force generated by the contact between the magnetic head slider and the magnetic disk, and the amplitude of vibration in the first preferred embodiment of the present invention.

FIG. 4 shows the relation between the friction force acting between the first surface constituting element 5a of the magnetic head slider 1 and the magnetic disk 10, and the vibration displacement (FIG. 3, in the direction of arrow B) of the magnetic head slider 1 in the first preferred embodiment of the present invention.

The friction force was measured by a friction sensor comprising a pair of parallel leaf springs and a strain gauge. For measuring the friction force with the actual magnetic disk device, for example, the friction force can be obtained indirectly by measuring the rotational torque of a spindle motor. For measuring the vibration displacement of the magnetic head slider 1, the velocity variation of the magnetic head slider 1 caused by contact in the direction of the arrow B is measured by a laser doppler vibrometer. The laser doppler vibrometer, model OFV2700 made by Polytec PI Inc. was used with a sampling frequency of 4 MHz. To remove the influence of the run-out frequency of the magnetic disk and the resonant frequency of the suspension, a high-pass filtering process of 40 KHz was applied to the data measured by the laser doppler vibrometer.

After the above data processing, the vibration displacement waveform was obtained by integrating the velocity data with time. The vibration amplitude shown in FIG. 4 indicates the value of the standard deviation of the vibration displacement waveform after the above signal processing. For measuring vibration displacement by contact with the actual magnetic disk device, for example, there is a method of measuring it from the read waveform of the magnetic head 9. When the vibration displacement is larger, jitter that is affected by the vibration in the direction of bits (peripheral direction) and off-track affected by the vibration in the direction of the track width will become more conspicuous, and the bit error rate of the magnetic disk device will be higher as a result of it.

As shown in FIG. 4, when the friction force is zero, that is, when the magnetic head slider 1 is floating on the magnetic disk 10 and does not contact the magnetic disk, a vibration of small amplitude of 0.3 nm is seen (friction is zero on the axis of abscissa in FIG. 4). When the flying height of the magnetic head 1 decreases further and the magnetic head 1 starts to touch the magnetic disk 10, the friction force between them increases. Corresponding to the increase of the friction force, the vibration amplitude increases gradually.

In case the friction force increases, if the moment by the friction force around pivots (supporting points that support the slider) is sufficiently smaller than the moment formed around the pivots by the force of the air flowing between the magnetic head slider and the magnetic disk, the magnetic head slider runs in contact with the magnetic disk stably, the increase of the vibration amplitude is small in spite of the contact, and according to the experimental result, the vibration amplitude is approximately 1 nm when the friction force is not more than 10 mN. In such a range where the friction force is not more than 10 mN, a similar bit error rate can be obtained relative to those obtained with a floating magnetic head. However, when the friction force exceeds 10 mN, the moment around the pivots by the friction force is equivalent to or more than the moment around the pivots by the air pressure, so that the vibration amplitude increases drastically. In such a region of the friction force, the magnetic head 9 cannot record or reproduce data on the magnetic disk 10 and the bit error rate increases suddenly.

With the preferred embodiment of the present invention, the friction force at which the vibration amplitude increases suddenly is 10 mN, but this critical friction force is considered to depend on the shape of the magnetic head slider. The magnetic head slider 1 of the preferred embodiment of the present invention has, as above described, the shallow depth 3 of the fourth surface constituting element 8 that generates a sub-ambient pressure force that is 900 nm, and, therefore, a slider which is 1.25 mm in length, 1.0 mm in width and 0.3 mm in thickness generates a very large sub-ambient pressure force of 30 mN for its size. Further, the magnetic head slider 1 contacts the magnetic disk 10 with the first surface constituting element 5a having small area, and the second, third and fourth surfaces are separated far from the magnetic disk 10; therefore, there is a an advantage in that the contacting surface is limited to the first surface constituting element 5a.

The magnetic head slider 1 of the preferred embodiment of the present invention comprises the structure provided with the above-described area (especially, the first surface constituting element 5a is set small) and the depth.

Considering these, when a magnetic head slider having a different configuration than the magnetic head slider 1 of the preferred embodiment of the present invention is used, the critical friction force is thought to be less than 10 mN. This means that the stable contact area is narrow, and this is not desirable from the point of view of the reliability of the magnetic disk device.

Figure 5:
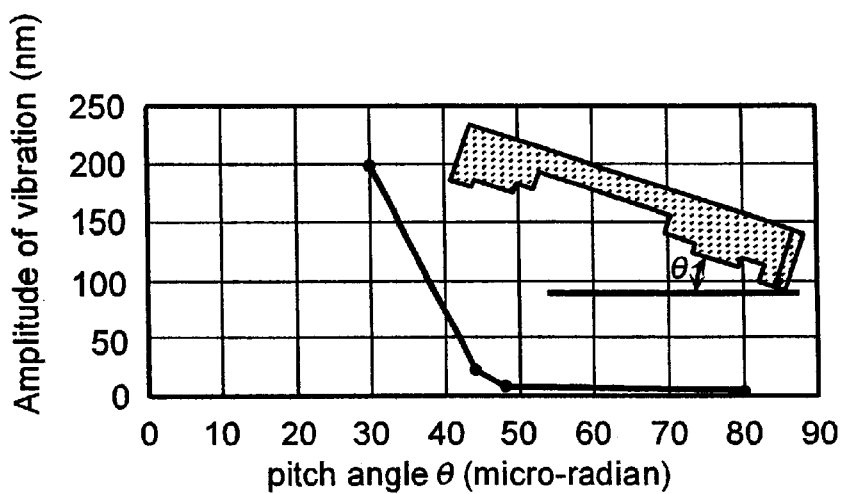
FIG. 5 is a graph showing the relation between the pitch attitude angle of the magnetic head slider and the amplitude of vibration in the first preferred embodiment of the present invention.

FIG. 5 is a diagram showing the relation between the pitch attitude angle θ and the vibration amplitude. The pitch attitude angle is obtained from the results of the flying height measurement. The flying height is measured with a Dynamic Flying Height Tester made by Phase Mertrics, Inc. The flying heights of the edge on the air flow-in side and the edge on the air flow-out side are measured using an ultra-smooth glass disk having a mean surface roughness Ra of 0.5 nm, and the pitch attitude angle θ is obtained by the difference of the flying heights and the distance between both measuring points.

As is shown by FIG. 5, when the pitch attitude angle decreases to not more than 50 micro-radian, the vibration amplitude abruptly increases. This means that when the magnetic head slider begins to contact the magnetic disk at the edge on the air flow-in side, the vibration amplitude will increase abruptly. Therefore, the pitch attitude angle must be at least 30 micro-radian or more, and it is preferable for the pitch attitude angle to be 50 micro-radian or more from the standpoint of reducing the vibration amplitude. As described, the configuration and pitch attitude angle of the magnetic head slider 1 affect the friction force, and therefore, affect the vibration amplitude strongly.

Similarly, the surface roughness and the form of the magnetic disk 10 are measured with the scanning probe microscope of Digital Instruments, Inc. The measuring area was 20 $\mu$m ×20 $\mu$m. The measuring resolution in the direction of height was 0.02 nm. The measured data was flattening treated by a two-stage filter before the analysis. As an index of surface roughness, adding to a generally used central surface roughness (mean surface roughness) Ra and maximum height Rp, peak counts are acquired simultaneously, since as the peak counts are found to substantially affect the vibration amplitude. The peak count is defined as the count of peaks exceeding a threshold level that is 1 nm above the centerline of the surface roughness (mean surface roughness plane). In other words, the peaks of the surface roughness exceeding the height of 1 nm from the mean surface roughness plane are counted. centerline of the surface roughness (mean surface roughness plane). In other words, the peaks of the surface roughness exceeding the height of 1 nm from the mean surface roughness plane are counted.

Each of the magnetic disks used for the experiments this time was a smooth disk having a mean surface roughness Ra of 1.5 nm and a glide height of 6 nm. The method of obtaining the glide height is as follows. The flying height of the slider was measured beforehand as a function of velocity using a special slider provided with an Acoustic Emission (AE) sensor. On the magnetic disk, in order to measure the glide height, the slider is floated. From the velocity, where the output of the AE sensor increases due to contact between the slider and the magnetic disk when the flying height is reduced by decreasing velocity gradually, the glide height can be defined by an inverse operation (a flying height acquired from the function between the flying height and the velocity).

There is a strong correlation among the mean surface roughness Ra, the maximum surface roughness height Rp and the glide height, and it is widely known that to decrease the glide height, the surface roughness must be reduced. However, when the surface roughness is lower, the contacting surface area is larger at the point of contact between the magnetic head slider and the magnetic disk, and the friction force will increase, resulting in an increase in the vibration amplitude. This adversely affects the reliability of the magnetic disk device profoundly.

To reduce the frequency of contact, a decrease of the glide height by smoothing the surface roughness will be effective, but the smoother surface will cause large vibrations when contact occurs, and, therefore, there is a contradictory request that surface roughness should not be made smoother. However, the inventors have found that the difference of peak counts, that are the index of microscopic form of the surface of the magnetic disk, strongly affects the vibration amplitude at the point of contact with a similar glide height as described below.

Figure 6:
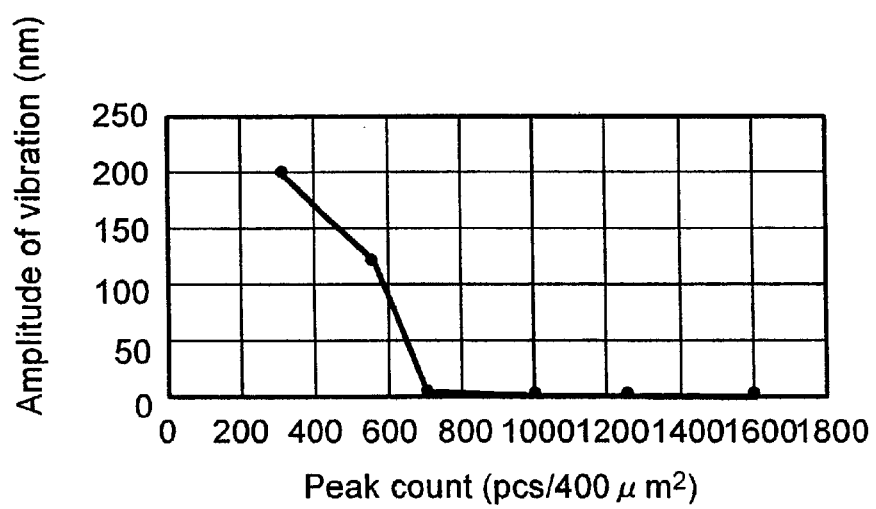
FIG. 6 is a graph showing the relation between the peak count of the magnetic disk and the amplitude of vibration of the magnetic head slider of the first preferred embodiment of the present invention.

FIG. 6 is a diagram showing the relation between the peak count, that is the index that shows the surface form of the magnetic disk 10, and the vibration amplitude. Disks providing the data shown in FIG. 6 are operates with a glide height of 6 nm. The peak counts varied from 250/400 $\mu$m$^2$ to 1600/400 $\mu$m$^2$.

As is shown by FIG. 6, the fewer the peak counts, the larger will be the vibration amplitude. On the other hand, the vibration amplitude decreases with the peak count of 700 or more. When the peak count is lower, the peak of the surface roughness is pushed down elastically by the contact force exerted at the point of contact, and the magnetic head slider contacts the magnetic disk surface at the mean plane of the surface roughness. Therefore, it is considered that the vibration amplitude increases with the larger friction force produced by the larger contacting surface. When the peak count exceeds a certain point, the many peaks of the surface roughness will share the contacting force, the deformation of the peaks of the surface roughness will be smaller and the increase of the contacting surface area will be prevented. Therefore, the friction force and the vibration amplitude are smaller. Though it could not be confirmed in the scope of the experiment at this time, it is predicted that the excessive peak count will increase the contacting area excessively and will increase the vibration amplitude.

As above described, a magnetic disk, used with a magnetic head slider which operates the low flying height, that involves consideration of contact between the magnetic head slider and the magnetic disk, requires consideration of peak counts adding to the reduction of the conventional surface roughness index Ra and Rp for reducing the glide height. In the preferred embodiment of the present invention, the peak count of 700/400 $\mu$m$^2$ or more is desirable for reducing the vibration amplitude.

Figure 7:
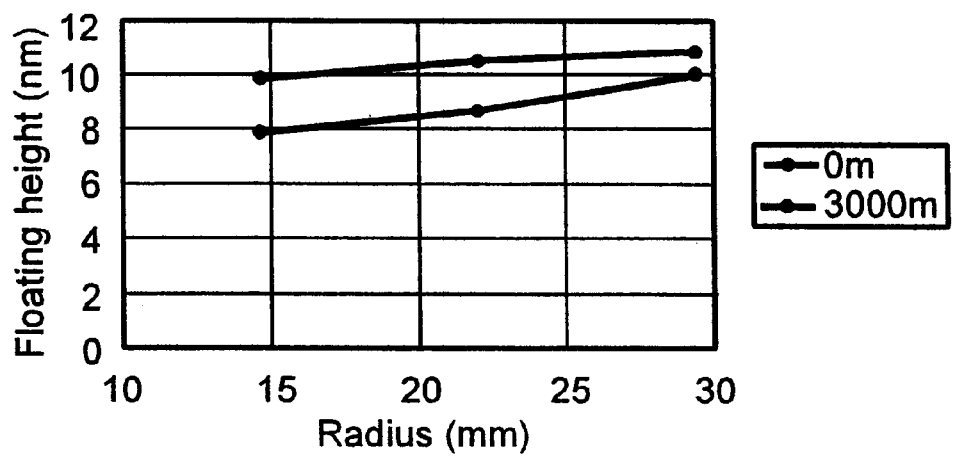
FIG. 7 is a graph showing the floating profiles of the magnetic head slider of the first preferred embodiment of the present invention at ground altitude and high altitude.

FIG. 7 shows a profile (calculated value) of the flying height of the magnetic head slider 1 over the whole surface of the magnetic disk operating at ground altitude and at high altitude. The calculation is carried out with a magnetic disk operating diameter of 65 mm (generally called 2.5 inch) and a spindle rotational speed of 4200 rpm. The average flying height at ground altitude is approximately 10 nm, and a uniform floating profile is realized over the whole surface of the magnetic disk (mainly by the effect of the depth d2 shown in FIG. 2). The decrease of the flying height at high altitude is 2 nm at the inner circumference of the magnetic disk and 1 nm at the outer circumference, and excellent floating profile is realized at high altitude.

In this example, the average flying height is assumed to be 10 nm, but the measured flying height of the mass-produced magnetic head slider varies due to variation of the manufacturing techniques.

With the magnetic head slider of the preferred embodiment of the present invention, the variation of the flying height of ±2 nm and a decrease of the flying height of 1 nm of the magnetic head slider during a seek operation are anticipated. Assuming the use of a smooth disk having a glide height of 6 nm, the magnetic head slider of the preferred embodiment of the present invention is assumed to contact the magnetic disk at the worst condition during operation at high altitude. The magnetic head slider of the preferred embodiment of the present invention is designed, as will be described later, to minimize a drop in the flying height during operation at high altitude.

As described above, the sub-ambient pressure force is large so that the variation of the flying height produced by variation of the manufacturing tolerances is smaller than those of the conventional cases. Therefore, in general, when the average flying height at ground altitude is 15 nm or less, the contact between the magnetic head slider and the magnetic disk must be considered at the worst condition.

Figure 8:
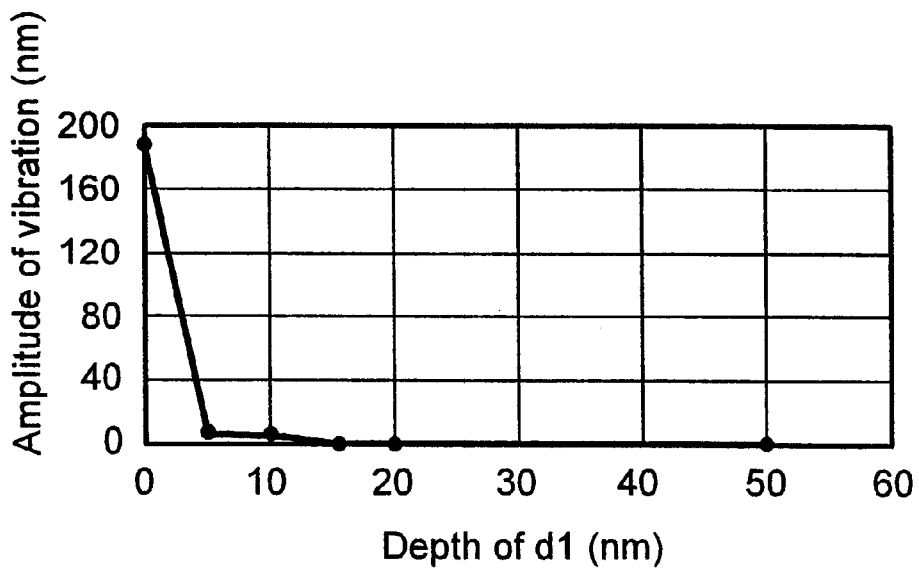
FIG. 8 is a graph showing the relation between the depth d1 between a first surface constituting element and a second surface constituting element of the magnetic head slider of the first preferred embodiment of the present invention, and the amplitude of vibration.

FIG. 8 is a diagram showing the relation between the depth d1 between the first surface and the second surface of the magnetic head slider 1 and the vibration amplitude. The area of the first surface is very small so that it does not significantly affect the floating force of the magnetic head slider. However, when the depth d1 is extremely shallow, such as 10 nm or less, the possibility of contacting the constituting surface 6a of the second surface increases with contact between the magnetic head slider 1 and the magnetic disk 10. Therefore, the depth d1 is preferred to be 10 nm or more.

Conversely, when the d1 is too deep, the surface 2 that represents the actual rail-surface is separated from the surface of the magnetic disk, and the sub-ambient pressure force is diminished, causing an undesirable condition with variation of the manufacturing tolerances and at the point of contact from the standpoint of stability. The depth d1 is desirably in the range of 10 nm to 50 nm.

Figure 9:
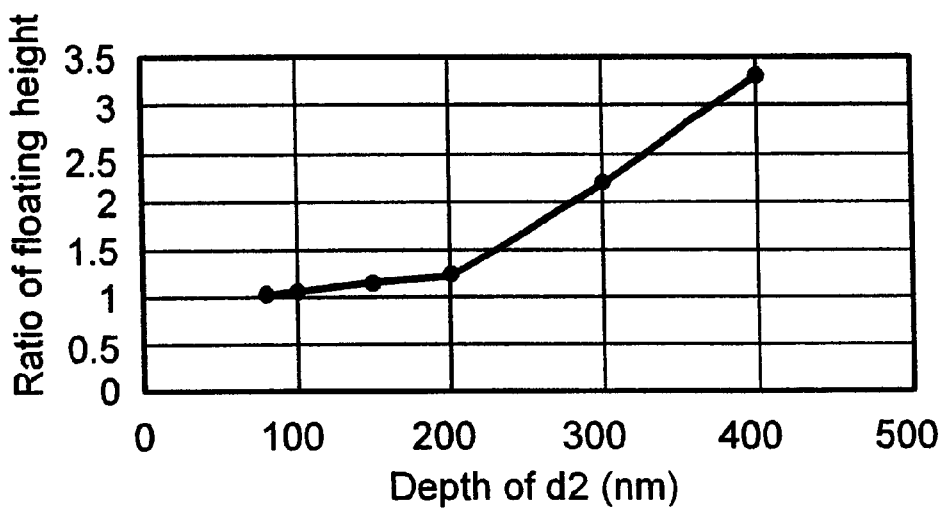
FIG. 9 is a graph showing the relation between the depth d2 between a second surface constituting element and a third surface constituting element of the magnetic head of the first preferred embodiment of the present invention, and the ratio of flying heights.

FIG. 9 is a diagram showing the relation between the depth d2 between the second surface and the third surface of the magnetic head slider 1 and the ratio of the maximum and minimum flying heights of the floating profile over the whole surface of the magnetic disk. The assumed condition is similar to that of FIG. 7.

As described above, the depth d2 strongly affects to the uniformity of the floating profile. In an actual case, when d2 is 200 nm or more, the floating ratio exceeds 1.2 and the uniform floating profile cannot be maintained anymore. On the other hand, when d2 is extremely shallow, the floating profile will be uniform, but the deviation of the flying height due to variation of the depth value of d2 will increase. Therefore, in the preferred embodiment of the present invention, the depth d2 of 50 nm to 200 nm is preferable from the viewpoint of equalizing the floating profile and decreasing the fluctuation of the flying height. An adequate depth d2 for equalizing the floating profile depends on the condition of the magnetic disk device. For example, in the case of a magnetic disk device having a 95 mm diameter (generally called a 3.5 inch) magnetic disk with a spindle rotational speed of 7200 rpm, the optimum depth d2 is 150 nm to 400 nm.

Figure 10:
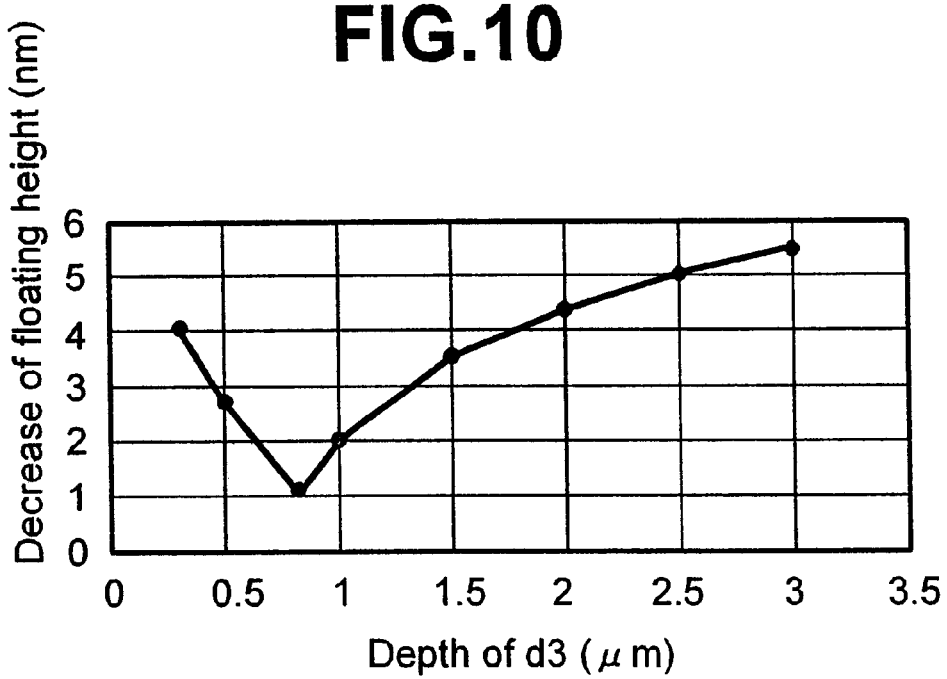
FIG. 10 is a graph showing the relation between the depth 3 between the third surface constituting element and the fourth surface constituting element of the magnetic head slider of the first preferred embodiment of the present invention, and the difference of flying heights at ground altitude and high altitude.

FIG. 10 is a diagram showing the relation between the depth d3 between the third surface and the fourth surface, and the decrease of the flying height at high altitude from the flying height at ground altitude. Generally, the decrease of the flying height at high altitude is more conspicuous at the inner circumference of the magnetic disk, so that the decrease of the flying height is measured at the inner circumference. The assumed condition is similar with that of FIG. 7.

FIG. 10 shows that the decrease of the flying height is minimum at the depth d3 of 800 nm. When d3 is larger or smaller than this value, which gives the minimum decrease of the flying height, the decrease of the flying height is larger. In the case of the magnetic disk device of the preferred embodiment of the present invention, the depth d3 of 400 nm to 1.3 $\mu$m is preferable. In other words, the position of the magnetic head slider relative the magnetic disk, referring to FIG. 3, is held at a certain flying height of the slider by effecting a balance between the sum of the slider suspension load W and the sub-ambient pressure force N, which is exerted on the fourth surface having the depth d3, and the positive pressure P, which is exerted on the slider.

If the sub-ambient pressure force does not change at high altitude from that of ground altitude in spite of the decrease in the positive pressure P at high altitude, the flying height of the slider drops proportionally to the decrease of the positive pressure; however, actually, the sub-ambient pressure force drops at high altitude, and, if the level of the drop of the sub-ambient pressure force is similar to the level of the drop of the positive pressure, similar floating relations are maintained both at high altitude and at ground altitude.

The depth d3, which maximizes the drop of the sub-ambient pressure force to the level of the drop of the positive pressure, is 800 nm. That is, it has the characteristic of changing the sub-ambient pressure force by the value of the depth d3. The optimum depth d3, which reduces the drop of the flying height at high altitude, depends on the unit condition. For example, in the case of a magnetic disk device having a 95 mm diameter magnetic disk, with a spindle rotational speed of 7200 rpm, an adequate depth d3 is 1 $\mu$m to 2.5 $\mu$m.

Figure 11:
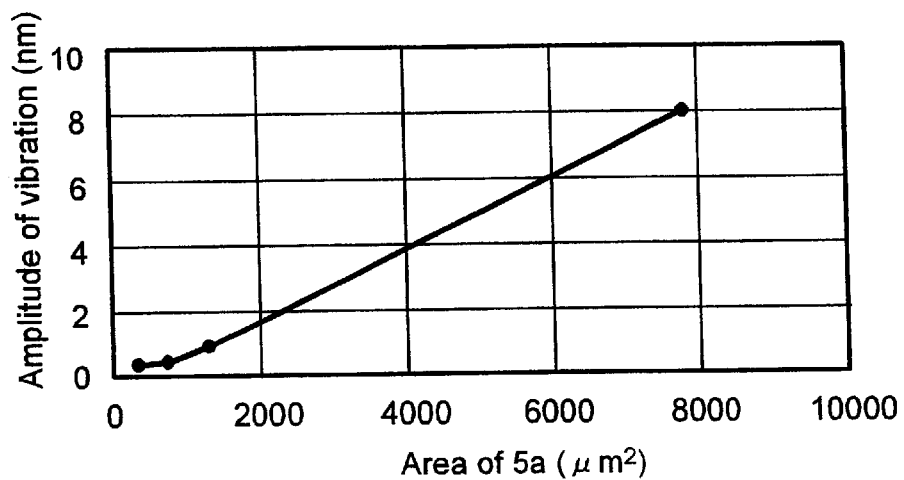
FIG. 11 is a graph showing the relation between the area of the first surface constituting element 5a of the magnetic head slider of the first preferred embodiment of the present invention, and the amplitude of vibration.

FIG. 11 is a diagram showing the relation between the area of the first surface constituting element 5a of the magnetic head slider 1 and the vibration amplitude. It shows that the vibration amplitude increases unilaterally with an increase of the area of the first surface constituting element 5a. Therefore, the area of the first surface constituting element 5a, which is the surface which comes into contact with the magnetic disk, must be as small as possible. For example, to limit the vibration amplitude to 1 $\mu$m or less, the area of the first surface constituting element 5a is desirably 1000 nm$^2$ or less.

In the preferred embodiment of the present invention, the magnetic head slider comprises four substantially parallel surfaces; and, when the surfaces are sequentially named from the surface nearest to the magnetic disk as a first surface, a second surface, a third surface and a fourth surface, in a state wherein the magnetic head slider faces the magnetic disk, the magnetic head slider is constituted in such a way that S1>S2>S3>S4, while the total area of the magnetic head slider existing inside the first surface is S1, the total area of the magnetic head slider existing inside the second surface is S2, the total area of the magnetic head slider existing inside the third surface is S3 and the total area of the magnetic head slider existing inside the fourth surface is S4.

Figure 12:
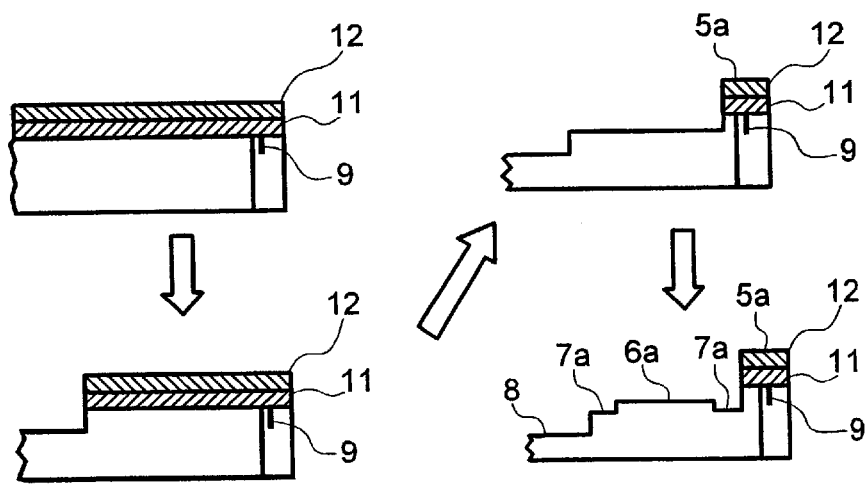
FIG. 12 is a process flow diagram illustrating an example of the process of producing a magnetic head slider of the first preferred embodiment of the present invention.

FIG. 12 shows an example of the process of producing the magnetic head slider of the present invention. Currently, as the base material of the magnetic head slider, sintered material, such as AlTiC, is generally used.

As a surface finally facing the magnetic disk, a carbon protecting film layer 12 is provided for the main purpose of preventing the corrosion of magnetic head 9, and this film layer 12 is formed on a silicon layer 11, which is an adhesive layer. In the preferred embodiment of the present invention, the desired shape is formed by repeating Ar ion milling three times, as is shown in FIG. 12. At the final step, the silicon adhesive layer 11 and the carbon protective layer 12 remain only on the first surface constituting element 5a, which is mounted with the magnetic head, and on the first surface constituting elements 5b and 5c.

In the preferred embodiment of the present invention, the Ar ion milling is used as the method of processing, but the essential part of the present invention is not the method of processing; and, therefore, the shape can be formed with any kinds of processing method.

Figure 13:
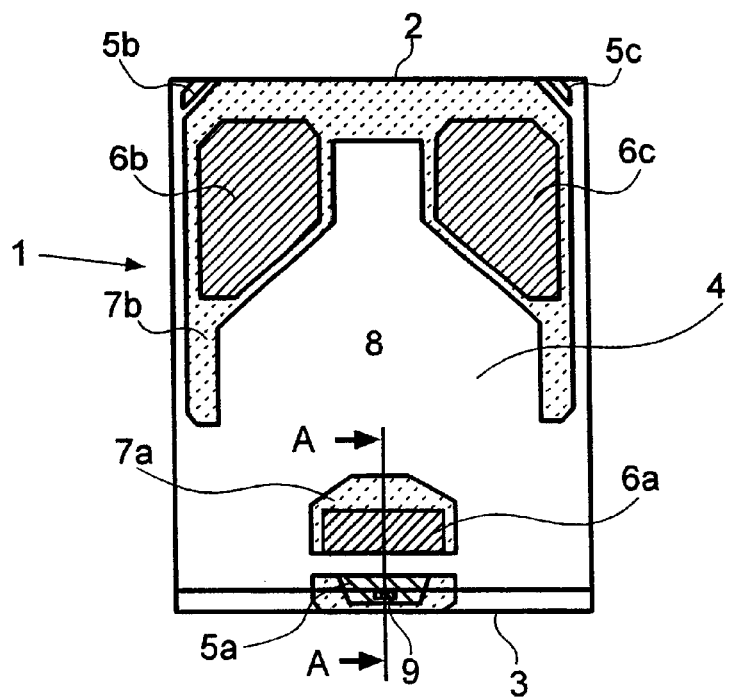
FIG. 13 is a top view of the magnetic head slider of a second preferred embodiment of the present invention.
Figure 14:
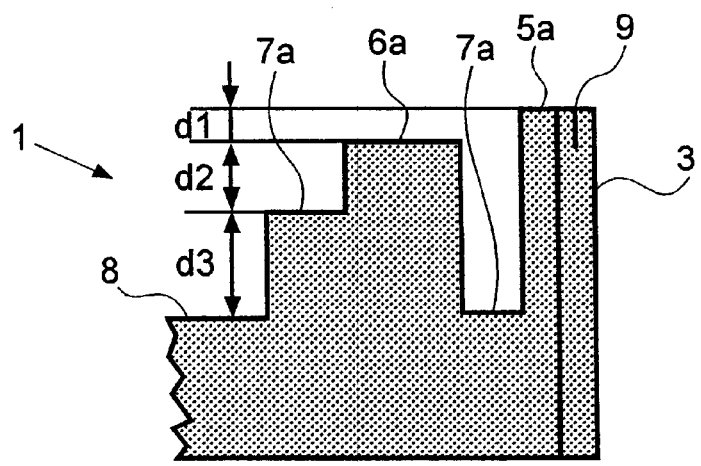
FIG. 14 is a cross-sectional view taken along lien A—A in the direction of arrows in the FIG. 13.

FIG. 13 is a top view of the magnetic head slider in accordance with a second preferred embodiment of the present invention, and FIG. 14 is a cross section taken along line A—A in FIG. 13.

The difference between the magnetic head slider 1 of the second preferred embodiment of the present invention and the magnetic head slider of the first preferred embodiment of the present invention is that the flow-in edge side of the first surface constituting element 5a and the flow-out edge side of the first surface constituting elements 5b and 5c are at the same depth as the fourth surface constituting element 8. By this preferred embodiment of the present invention, as there is no third surface constituting element 7a which is connected to the first surface constituting element 5a, the floating force generated by the first surface constituting element 5a can be decreased more than that of the first preferred embodiment of the present invention.

Figure 15:
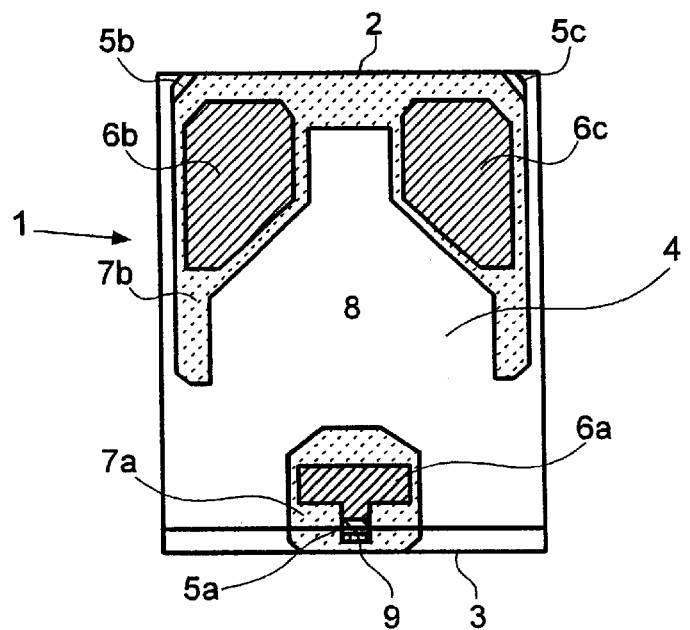
FIG. 15 is a top view of the magnetic head slider of a third preferred embodiment of the present invention.

FIG. 15 is a top view of a magnetic head slider which constitutes a third preferred embodiment of the present invention. The first surface constituting element 5a and the second surface constituting element 6a of the magnetic head slider of the third preferred embodiment of the present invention are not separated by the third surface constituting element 7a, but are formed continuously. The area of the first surface constituting element 5a is made smaller to the extent that the size of the magnetic head 9 allows.

Figure 16:
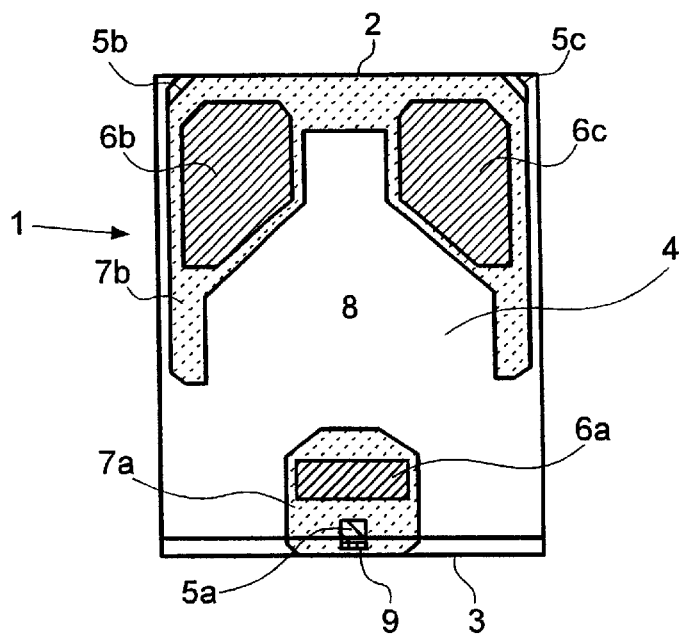
FIG. 16 is a top view of the magnetic head slider of a fourth preferred embodiment of the present invention.

FIG. 16 is a top view of a magnetic head slider constituting a fourth preferred embodiment of the present invention. Like the third preferred embodiment of the present invention, the size of the first surface constituting element 5a is made as small as possible, and the third surface constituting element 7a separates the first surface constituting element 5a from the second surface constituting element 6a.

Figure 17:
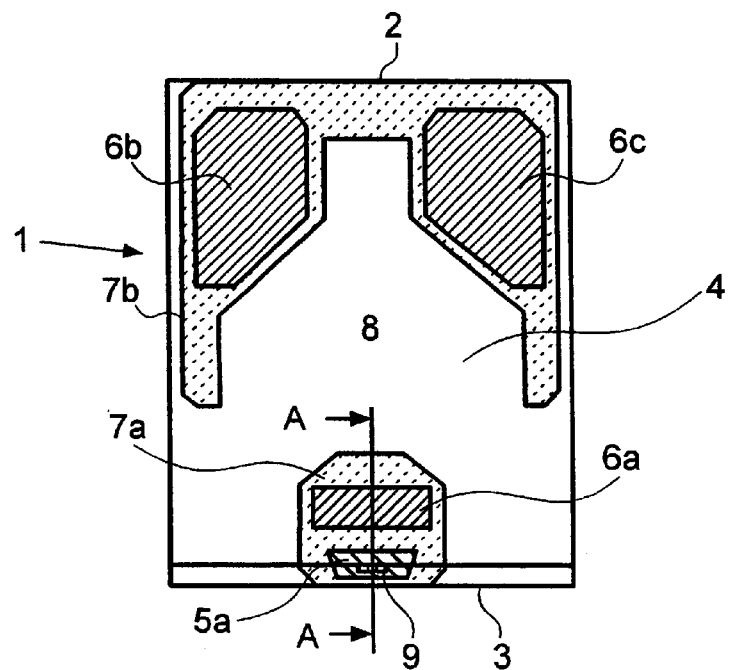
FIG. 17 is a top view of the magnetic head slider of fifth preferred embodiment of the present invention.

FIG. 17 is a top view of a magnetic head slider constituting a fifth preferred embodiment of the present invention. The shape of the magnetic head slider of the fifth preferred embodiment of the present invention is similar to that of the first preferred embodiment of the present invention, but without provision of the first surface constituting elements 5b and 5c positioned on the side the air flows in. While the magnetic head and the magnetic disk perform the recording and the reproduction while in contact, the first surface constituting elements 5b and 5c are floating separately on the magnetic head, and so these surfaces are not related to the essence of the present invention.

Figure 18:
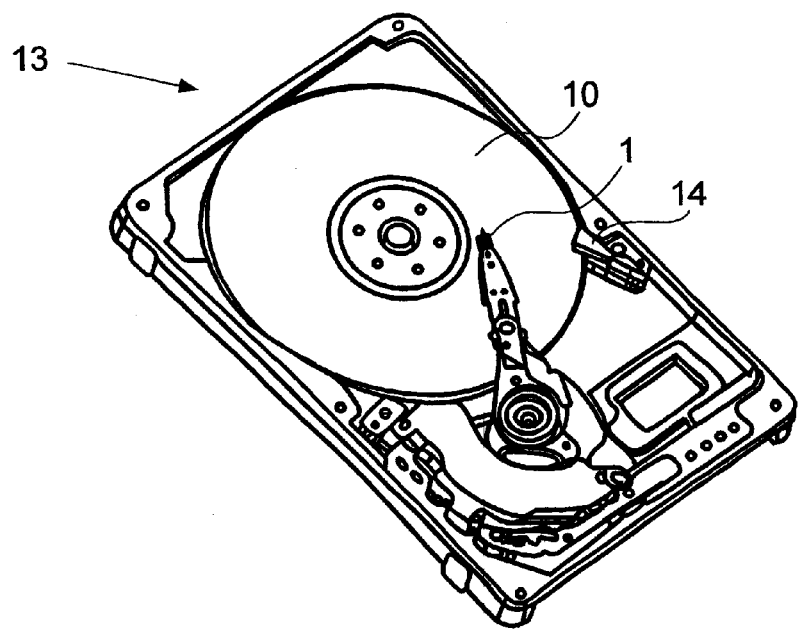
FIG. 18 is a perspective view of a magnetic disk device mounted with a load/unload mechanism provided with the magnetic head slider of the present invention.

FIG. 18 is a perspective view of the magnetic disk device 13 mounted with the magnetic head slider, which is implemented by the first to fifth preferred embodiments of the present invention. This magnetic disk device is provided with a load/unload mechanism, and the magnetic head slider 1 stands by on a ramp 14 while the magnetic disk device is stopped. Only while the magnetic disk device is in operation will the magnetic head slider be loaded on the magnetic disk 10 and the recording or the reproduction executed. Using the magnetic head slider of this preferred embodiment of the present invention, the vibration of the magnetic head slider is not amplified by contact with the magnetic disk during the recording or the reproduction operations, and stable recording or reproduction can be continued for a long time.

Figure 19:
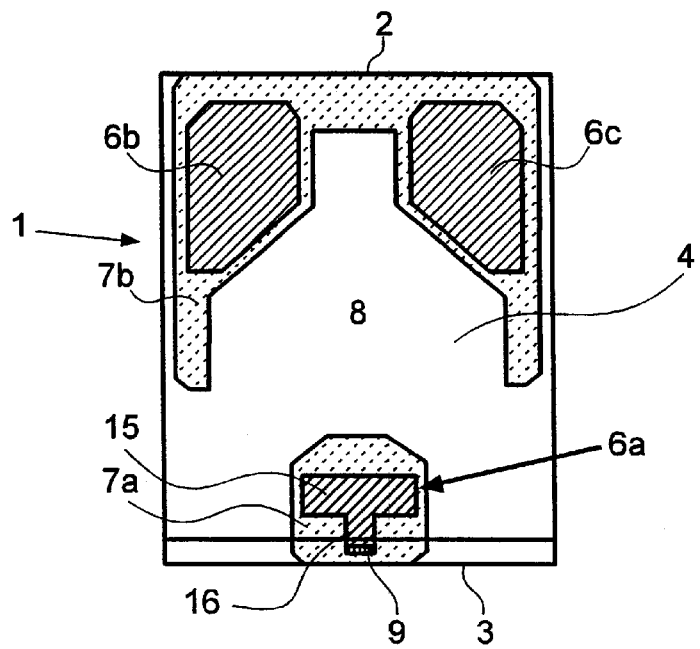
FIG. 19 is a top view of the magnetic head slider of a sixth preferred embodiment of the present invention.

FIG. 19 is a top view of a magnetic head slider constituting a sixth preferred embodiment of the present invention.

The floating surface of the magnetic head slider of the first to fifth preferred embodiments of the present invention comprises for substantially parallel surfaces, but the floating surface of the magnetic head slider of the sixth preferred embodiment of the present invention comprises three substantially parallel surfaces. That is, the magnetic head slider comprises surfaces 6a, 6b and 6c which are rail surfaces, surfaces 7a and 7b which are step air bearing surfaces, and surface 8 which is at the bottom of a recess for generating a sub-ambient pressure force.

The feature of the sixth preferred embodiment of the present invention is that the rail surface 6a is formed to have a T-shape by the combination of a long sideway rail part 15 which extends in the crosswise direction of the slider and a lengthwise rail part 16 which extends in the direction of the length. By such a configuration, the long sideway rail part 15, being formed continuously from the step air bearing 7a, generates a floating force and floats on the magnetic disk 10. On the other hand, since the lengthwise rail part 16 is narrow and cannot generate enough floating force, the flow-out edge and the vicinity of the lengthwise rail part mounted with the magnetic head 9 contacts the magnetic disk. Furthermore, the area of the lengthwise rail part is narrow so that the vibration amplitude at the contact point with the magnetic disk can be kept smaller.

The contacting part of the magnetic head slider of this preferred embodiment of the present invention is not separated three dimensionally compared with those of the first to fifth preferred embodiment of the present invention, and, if the vibration amplitude happens to be enlarged, there is a possibility of the danger that the long sideways rail part 15 will contact the magnetic disk. However, there is the advantage that the ion milling steps can be reduced by one step compared to those of the first and second preferred embodiment of the present invention, since the long sideways rail part 15 and the lengthwise rail part 16 are on the same plane.

The center rail shape of the magnetic head slider of the sixth preferred embodiment of the present invention can be formed by not only an ion milling process, but also by the Focus Ion Beam (FIB) process. The FIB process is frequently used for forming the track width of the magnetic head with a high precision.

The lengthwise rail part 16 of the sixth preferred embodiment of the present invention can also be formed by forming the flow-out edge side of the rail surface 6a during the forming of the track width. In this case, a step difference, of which depth is different from that of the step air bearing 7a formed by ion milling, is formed around the lengthwise rail part 16.

Figure 20:
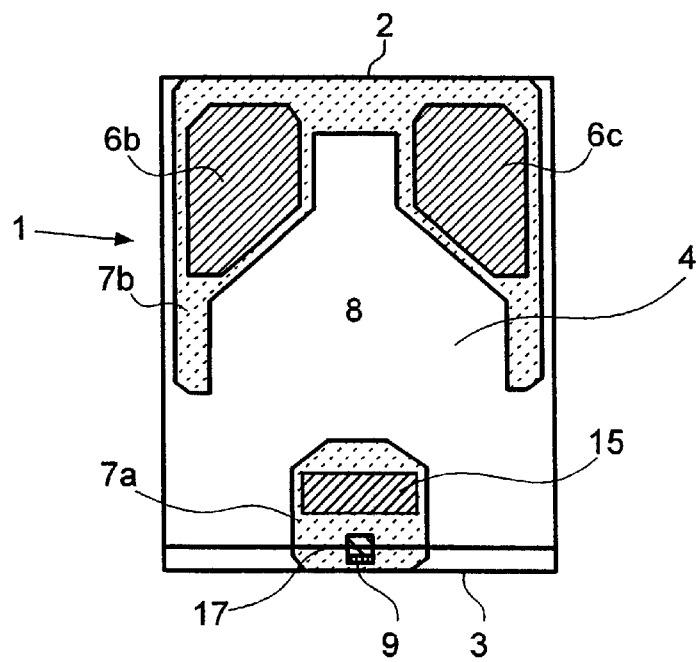
FIG. 20 is a top view of the magnetic head slider of a seventh preferred embodiment of the present invention.

FIG. 20 is a top view of a magnetic head slider constituting a seventh preferred embodiment of the present invention.

The floating surface 4 of the magnetic head slider of the seventh preferred embodiment of the present invention comprises three substantially parallel surfaces similar to that of the sixth preferred embodiment of the present invention. However, in contrast to the sixth preferred embodiment of the present invention, the step air bearing 7a separates the long sideways rail part 15 from a contact pad 17.

Both with the sixth and seventh preferred embodiments of the present invention, it is important for decreasing the vibration amplitude that the area of the rail part near the element part contacting the magnetic disk, comprising the lengthwise rail part 16 and the contact pad 17, is narrower than the area of the long sideways rail part 15 which generates the floating force.

As described above, the present invention has the effect of maintaining high reliability by equalizing the flying height over the whole surface of the magnetic disk and of reducing the change of the flying height produced by variation of the processing, during the seek operation and during operation at high altitude, so that the magnetic head will slide on the surface of the magnetic disk smoothly at the contact point between the magnetic head and the magnetic disk.

What is claimed is:

1. A magnetic head slider comprising:

a plurality of surfaces which are formed sequentially from an adjacent side to a magnetic disk; and a slider rail surface, which is arranged near an air flow-out edge on a nearest surface of said plurality of surfaces comprises a long sideways rail surface on an air flow in side and a lengthwise rail surface on an air flow out side, has a magnetic head;

wherein said nearest surface is arranged only in a center area with respect to a width of said slider near said air flow-out edge and has a width substantially less than the width of said slider;

wherein an area of said long sideways rail surface is larger than an area of said lengthwise rail surface.

2. A magnetic head slider according to claim 1, wherein a width of said long sideways rail surface is wider than a width of said lengthwise rail surface.

3. A magnetic head slider according to claim 2, wherein a width of said long sideways rail surface is wider than a width of said lengthwise rail surface.

4. A magnetic head slider comprising:

a step air bearing surface which is arranged only in a center area with respect to a width of said slider near an air flow-out edge on said slider and has a width substantially less than the width of said slider; and a slider rail surface, which is arranged near said air flow-out edge on said step air bearing surface comprises a long sideways rail surface on an air flow-in side and a lengthwise rail surface on an air flow-out side, has a magnetic head;

wherein an area of said long sideways rail surface is larger than an area of said lengthwise rail surface.

5. A magnetic head slider comprising:

a step air bearing surface, which is arranged only in a center area with respect to a width of said slider near an air flow-out edge on said slider and has a width substantially less than the width of said slider;

a slider rail surface, which is arranged near the air flow-out edge on said step air bearing surface; and a member which is arranged between said slider rail surface and said air flow-out edge;

wherein an area of said slider rail surface is larger than an area of said member.

6. A magnetic head slider according to claim wherein a height of said slider rail surface from said step air bearing surface is different from a height of said member from said step air bearing surface.

7. A magnetic head slider according to claim 5, wherein said slider rail surface is separate from said member.

8. A magnetic head slider according to claim 5, wherein a width of said slider rail surface is wider than a width of said member.

9. A magnetic head slider according to claim 5, wherein said member is another slider rail surface.

10. A magnetic head slider according to claim 5, wherein said member includes a contact pad.

* * * * *